United States Patent
Tang

(10) Patent No.: US 10,250,521 B2
(45) Date of Patent: Apr. 2, 2019

(54) DATA STREAM IDENTIFYING METHOD AND DEVICE

(71) Applicant: Huawei Technologies Co., Ltd., Shenzhen (CN)

(72) Inventor: Huaxin Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 15/166,619

(22) Filed: May 27, 2016

(65) Prior Publication Data

US 2016/0277306 A1 Sep. 22, 2016

Related U.S. Application Data

(63) Continuation of application No. PCT/CN2014/074609, filed on Apr. 2, 2014.

(30) Foreign Application Priority Data

Nov. 29, 2013 (CN) .......................... 2013 1 0629389

(51) Int. Cl.
  *H04L 29/08* (2006.01)
  *H04L 12/911* (2013.01)

(52) U.S. Cl.
  CPC .............. *H04L 47/70* (2013.01); *H04L 67/10* (2013.01); *H04L 67/2833* (2013.01)

(58) Field of Classification Search
  CPC ...... H04L 47/10; H04L 67/10; H04L 67/2833
  (Continued)

(56) References Cited

U.S. PATENT DOCUMENTS 8,331,234 B1 12/2012 Newton et al.
2007/0130120 A1* 6/2007 Chen ................. G06F 17/30882
(Continued)

FOREIGN PATENT DOCUMENTS

CN 101184000 A 5/2008
CN 101252541 A 8/2008
(Continued)

OTHER PUBLICATIONS

Partial English Translation and Abstract of Chinese Patent Application No. CN103618792, Part 1, Jun. 8, 2016, 6 pages.
(Continued)

*Primary Examiner* — James E Springer
(74) *Attorney, Agent, or Firm* — Conley Rose, P.C.

(57) ABSTRACT

A data stream identifying method and device is presented, which may include receiving a data stream of a first application and a data stream of a second application; extracting a common resource address in the data stream of the first application and the data stream of the second application; determining that the data stream of the first application belongs to the second application when the common resource address includes an address of a server of the first application; and determining that the data stream of the second application belongs to the first application when the common resource address includes an address of a server of the second application. Further, an application to which a data stream belongs can be more correctly identified, so that more accurate data is provided for services, such as traffic statistics and charging, thereby improving user experience.

18 Claims, 6 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2008/0115047 A1* | 5/2008 | Petri | G06F 17/30873 |
| | | | 715/205 |
| 2010/0153539 A1* | 6/2010 | Zarroli | G06F 17/30864 |
| | | | 709/224 |
| 2011/0019574 A1 | 1/2011 | Malomsoky et al. | |
| 2011/0150433 A1* | 6/2011 | Alexandrov | H04N 5/91 |
| | | | 386/328 |
| 2012/0057517 A1* | 3/2012 | Kambhatla | G06F 3/1423 |
| | | | 370/315 |
| 2013/0024778 A1 | 1/2013 | Reeves et al. | |
| 2013/0198391 A1* | 8/2013 | Weissblum | H04L 63/306 |
| | | | 709/227 |
| 2013/0276017 A1* | 10/2013 | Walker | H04N 21/44204 |
| | | | 725/25 |
| 2015/0029925 A1* | 1/2015 | Mantin | H04W 72/005 |
| | | | 370/312 |
| 2016/0119395 A1* | 4/2016 | Li | H04L 12/189 |
| | | | 709/219 |

FOREIGN PATENT DOCUMENTS

| | | |
|---|---|---|
| CN | 101582897 A | 11/2009 |
| CN | 103200231 A | 7/2013 |
| CN | 103618792 A | 3/2014 |

OTHER PUBLICATIONS

Partial English Translation and Abstract of Chinese Patent Application No. CN103618792, Part 2, Jun. 8, 2016, 3 pages.
Partial English Translation and Abstract of Chinese Patent Application No. CN101582897, Jun. 20, 2016, 10 pages.
Foreign Communication From a Counterpart Application, Chinese Application No. 201310629389.1, Chinese Office Action dated May 9, 2016, 6 pages.
Foreign Communication From a Counterpart Application, PCT Application No. PCT/CN2014/074609, English Translation of International Search Report dated Sep. 4, 2014, 2 pages.
Foreign Communication From a Counterpart Application, PCT Application No. PCT/CN2014/074609, English Translation of Written Opinion dated Sep. 4, 2014, 6 pages.

* cited by examiner

DATA STREAM IDENTIFYING METHOD AND DEVICE

CROSS-REFERENCE TO RELATED APPLICATIONS

This application is a continuation of International Application No. PCT/CN2014/074609, filed on Apr. 2, 2014, which claims priority to Chinese Patent Application No. 201310629389.1, filed on Nov. 29, 2013, all of which are hereby incorporated by reference in their entireties.

TECHNICAL FIELD

The present disclosure relates to the field of network technologies, and in particular, to a data stream identifying method and device.

BACKGROUND

With popularization and development of a network, information exchange between an application in a terminal and a server becomes increasingly frequent. To implement functions such as analysis, statistics collection, or charging of a data stream generated by an application, an application to which a data stream belongs needs to be determined.

Currently, an application to which a data stream belongs is generally identified according to a protocol type of the data stream. After a data stream is received, an application to which the data stream belongs is identified according to a feature code included in a protocol of the data stream. If applications are independent of each other, a belonging relationship between a data stream and an application can be correctly determined using this identifying method.

However, a mutual nesting relationship generally exists between different applications. That is, a second application is nested on a page of a first application, for example, a video clip on the YouTube® website can be watched on a Facebook® web page, and an online game that is provided by a third-party game company can be played on a Facebook® homepage. In this way, when the second application is enabled on the page of the first application, a data stream generated by the second application is generated on the page of the first application. Therefore, the data stream generated by the second application should belong to the first application. However, if an existing data stream identifying manner is adopted, an identification code included in a protocol of the data stream generated by the second application indicates that the data stream belongs to the second application. Therefore, an identification error occurs.

It may be learned that in a case in which there exists a nesting relationship between applications, there is a high identification error rate problem when the existing identifying manner is used. Therefore, a correspondence between an application and a data stream cannot be obtained correctly, thereby failing to provide correct basic data for subsequent functions, such as analysis, statistics collection, or charging.

SUMMARY

Embodiments of the present disclosure provide a data stream identifying method and device, so as to more correctly identify an application to which a data stream belongs, so that more accurate data is provided for services, such as traffic statistics and charging, thereby improving user experience.

To resolve the foregoing technical problem, the embodiments of the present disclosure disclose the following technical solutions.

According to a first aspect, a data stream identifying method is provided, including receiving a data stream of a first application and a data stream of a second application; extracting a common resource address in the data stream of the first application and the data stream of the second application; determining that the data stream of the first application belongs to the second application when the common resource address includes an address of a server of the first application; and determining that the data stream of the second application belongs to the first application when the common resource address includes an address of a server of the second application.

With reference to the foregoing first aspect, in a first possible implementation manner, after the receiving a data stream of a first application and a data stream of a second application, and before the extracting a common resource address in the data stream of the first application and the data stream of the second application, the method further includes determining whether the data stream of the first application and/or the data stream of the second application are/is complete; and if the data stream of the first application and/or the data stream of the second application are/is not complete, restoring the data stream of the first application and/or the data stream of the second application to complete data streams/a complete data stream in a fragmentation and reassembling manner.

With reference to the foregoing first aspect, in a second possible implementation manner, the extracting a common resource address in the data stream of the first application and the data stream of the second application includes respectively acquiring all data packets in the data stream of the first application and the data stream of the second application to obtain a first data packet group and a second data packet group; respectively parsing the first data packet group and the second data packet group to obtain a first dataset and a second dataset; and extracting the common resource address in the first dataset and the second dataset.

With reference to the foregoing first aspect, in a third possible implementation manner, the extracting a common resource address in the data stream of the first application and the data stream of the second application includes respectively acquiring all data packets in the data stream of the first application and the data stream of the second application to obtain a first data packet group and a second data packet group; respectively parsing the first data packet group and the second data packet group to obtain a first compressed dataset and a second compressed dataset; respectively decompressing the first compressed dataset and the second compressed dataset to obtain a first dataset and a second dataset; and extracting the common resource address in the first dataset and the second dataset.

According to a second aspect, a data stream identifying device is provided, including a receiving module configured to receive a data stream of a first application and a data stream of a second application; an extracting module configured to extract a common resource address in the data stream of the first application and the data stream of the second application; a first determining module configured to determine that the data stream of the first application belongs to the second application when the common resource address includes an address of a server of the first application; and a second determining module configured to determine that the data stream of the second application belongs to the first application when the common resource address includes an address of a server of the second application.

With reference to the foregoing second aspect, in a first possible implementation manner, the device further includes a judging module configured to determine whether the data stream of the first application and/or the data stream of the second application are/is complete; and a fragmentation and reassembling module configured to, when the data stream of the first application and/or the data stream of the second application are/is not complete, restore the data stream of the first application and/or the data stream of the second application to complete data streams/a complete data stream in a fragmentation and reassembling manner.

With reference to the foregoing second aspect, in a second possible implementation manner, the extracting module includes a first acquiring unit configured to respectively acquire all data packets in the data stream of the first application and the data stream of the second application to obtain a first data packet group and a second data packet group; a first parsing unit configured to respectively parse the first data packet group and the second data packet group to obtain a first dataset and a second dataset; and a first extracting unit configured to extract the common resource address in the first dataset and the second dataset.

With reference to the foregoing second aspect, in a third possible implementation manner, the extracting module includes a second acquiring unit configured to respectively acquire all data packets in the data stream of the first application and the data stream of the second application to obtain a first data packet group and a second data packet group; a second parsing unit configured to respectively parse the first data packet group and the second data packet group to obtain a first compressed dataset and a second compressed dataset; a decompressing unit configured to respectively decompress the first compressed dataset and the second compressed dataset to obtain a first dataset and a second dataset; and a second extracting unit configured to extract the common resource address in the first dataset and the second dataset.

According to a third aspect, a data stream identifying device is provided, including a processor and a memory, where the memory stores an operation instruction that the processor can execute, and the processor reads the operation instruction in the memory so as to receive a data stream of a first application and a data stream of a second application; extract a common resource address in the data stream of the first application and the data stream of the second application; determine that the data stream of the first application belongs to the second application when the common resource address includes an address of a server of the first application; and determine that the data stream of the second application belongs to the first application when the common resource address includes an address of a server of the second application.

One technical solution of the foregoing technical solutions has the following advantages or beneficial effects.

In the foregoing technical solutions, when a first application is nested in a second application, the second application needs to acquire a resource address that is of the first application and stored on a server of the second application, and a data stream that is of the second application and includes the resource address is generated in this process; and when the first application acquires a resource on a server of the first application using the resource address, a data stream that is of the first application and includes the resource address is generated. Because the resource address is a way to acquire the resource on the server of the first application, the resource address includes an address of the server of the first application. As can be learned from the foregoing content, when a common resource address includes the address of the server of the first application, it indicates that the first application is nested in the second application, and the data stream of the first application belongs to the second application. Similarly, when the common resource address includes an address of the server of the second application, it indicates that the second application is nested in the first application, and the data stream of the second application belongs to the first application. Therefore, in the embodiments of the present disclosure, an application to which a data stream belongs can be identified more correctly, so that more accurate data is provided for services, such as traffic statistics and charging, thereby improving user experience.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
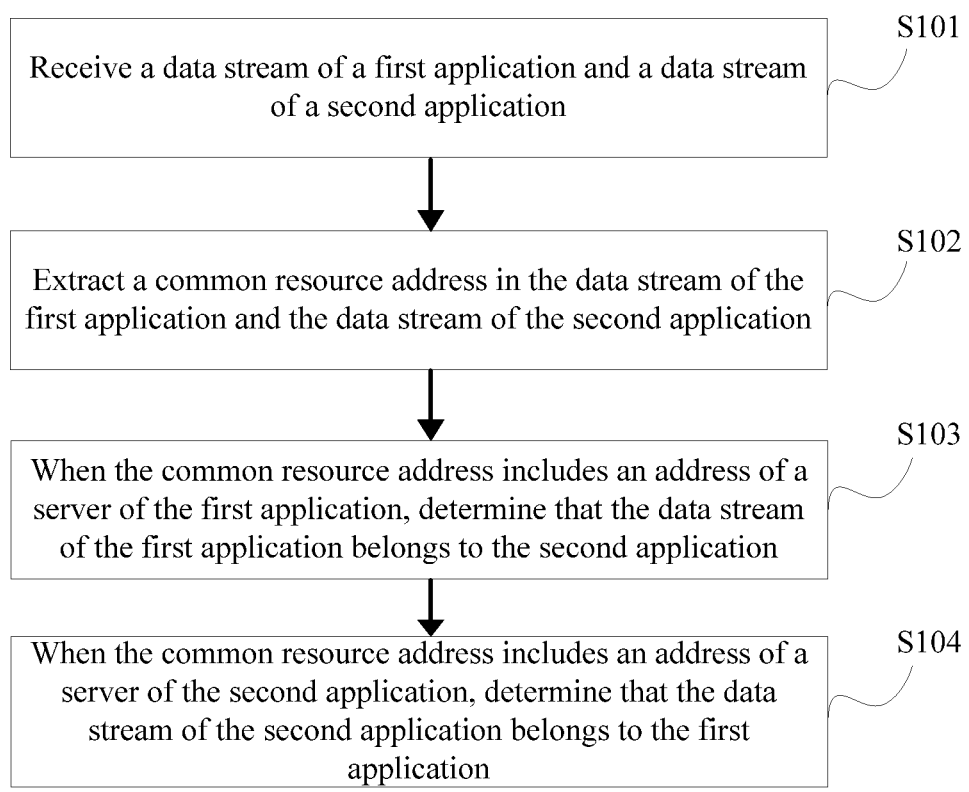
FIG. 1 is a flowchart of a data stream identifying method according to an embodiment of the present disclosure.

FIG. 1 shows a data stream identifying method according to an embodiment of the present disclosure. In the method provided in this embodiment of the present disclosure, a belonging relationship between an application and a data stream can be identified accurately, where the method includes the following steps.

Step S101: Receive a data stream of a first application and a data stream of a second application.

The data stream of the first application is a data stream generated when a terminal accesses a server of the first application, and the data stream of the second application is a data stream generated when the terminal accesses a server of the second application. The first application and the second application are application programs running on the terminal. When there is no nesting relationship between the first application and the second application, the first application and the second application are application programs running independently. For example, the first application is a web page that displays the Facebook® website, and the second application is a web page that displays the YouTube® website. When the second application is nested in the first application, the first application is an application program running independently, and the second application is an application program nested in the first application. For example, the first application is a web page that displays the Facebook website, and the second application is a video window that is nested on the web page of the Facebook website and displays a YouTube server resource. When the first application is nested in the second application, the second application is an application program running independently, and the first application is an application program nested in the second application. For example, the second application is a web page that displays the Facebook website, and the first application is a video window that is nested on the web page of the Facebook website and displays a YouTube server resource. Certainly, in addition to web pages of a website, the first application and the second application may be application programs of another type, such as software.

Step S102: Extract a common resource address in the data stream of the first application and the data stream of the second application.

In a case in which there is a nesting relationship between the first application and the second application, when the first application and the second application are enabled, a common resource address is generated in the data stream of the first application and the data stream of the second application.

It is assumed that the second application is nested in the first application, and a user enables the second application. The second application cannot learn where and how to acquire a resource on the server of the second application because the second application is an application program nested in the first application. When the user calls a resource of the second application, the first application needs to acquire a resource address that is of the second application and is pre-saved on the server of the first application. In this process, a data stream that is of the first application and includes the resource address is generated. In this case, the second application acquires a resource on the server of the second application using the resource address, so that a data stream that is of the second application and includes the resource address is generated. Therefore, a common resource address is generated in the data stream of the first application and the data stream of the second application. Because the resource address is a way to acquire the resource on the server of the second application, the resource address includes an address of the server of the second application.

Certainly, in a case in which the first application is nested in the second application, after the first application is enabled, a common resource address is also generated in the data stream of the first application and the data stream of the second application, but the resource address includes the server address of the first application.

In addition, a resource address may be a uniform resource locator (URL), also referred to as a web page address, a uniform resource identifier (URI), an Internet Protocol (IP) address, a HOST address (that is, an address of a server), or the like.

Step S102 that extract a common resource address in the data stream of the first application and the data stream of the second application may include the following three substeps, where the three substeps are as follows.

(11) Respectively acquire all data packets in the data stream of the first application and the data stream of the second application to obtain a first data packet group and a second data packet group.

Both the first data packet group and the second data packet group include at least one data packet. Both an associated keyword and associated information are stored in a data packet of a data stream of an application.

(12) Respectively parse the first data packet group and the second data packet group to obtain a first dataset and a second dataset.

The first dataset and the second dataset are respectively a set of data included in the data stream of the first application and a set of data included in the data stream of the second application.

(13) Extract the common resource address in the first dataset and the second dataset.

In step S102, if there is an extremely large amount of data in a data stream of an application, data in the data stream is compressed, so as to achieve a purpose of saving space. In a case in which there is an extremely large amount of data in a data stream, step S102 includes the following four substeps, where the four substeps are as follows:

(21) Respectively acquire all data packets in the data stream of the first application and the data stream of the second application to obtain a first data packet group and a second data packet group.

(22) Respectively parse the first data packet group and the second data packet group to obtain a first compressed dataset and a second compressed dataset.

Both the first compressed dataset and the second compressed dataset are sets constituted by compressed data.

(23) Respectively decompress the first compressed dataset and the second compressed dataset to obtain a first dataset and a second dataset.

The first dataset and the second dataset are respectively a set of data included in the data stream of the first application and a set of data included in the data stream of the second application.

(24) Extract the common resource address in the first dataset and the second dataset.

Step S103: When the common resource address includes an address of a server of the first application, determine that the data stream of the first application belongs to the second application.

When the common resource address in the data stream of the first application and the data stream of the second application includes the address of the server of the first application, it indicates that the first application is nested in the second application, and the data stream of the first application belongs to the second application.

Step S104: When the common resource address includes an address of a server of the second application, determine that the data stream of the second application belongs to the first application.

When the common resource address in the data stream of the first application and the data stream of the second application includes the address of the server of the second application, it indicates that the second application is nested in the first application, and the data stream of the second application belongs to the first application.

In the embodiment shown in FIG. 1, when a first application is nested in a second application, the second application needs to acquire a resource address that is of the first application and stored on a server of the second application, and a data stream that is of the second application and includes the resource address is generated in this process; and when the first application acquires a resource on a server of the first application using the resource address, a data stream that is of the first application and includes the resource address is generated. Because the resource address is a way to acquire the resource on the server of the first application, the resource address includes an address of the server of the first application. As can be learned from the foregoing content, when a common resource address includes the address of the server of the first application, it indicates that the first application is nested in the second application, and the data stream of the first application belongs to the second application. Similarly, when the common resource address includes an address of the server of the second application, it indicates that the second application is nested in the first application, and the data stream of the second application belongs to the first application. Therefore, in this embodiment of the present disclosure, an application to which a data stream belongs can be identified more correctly, so that more accurate data is provided for services, such as traffic statistics and charging, thereby improving user experience.

Figure 2:
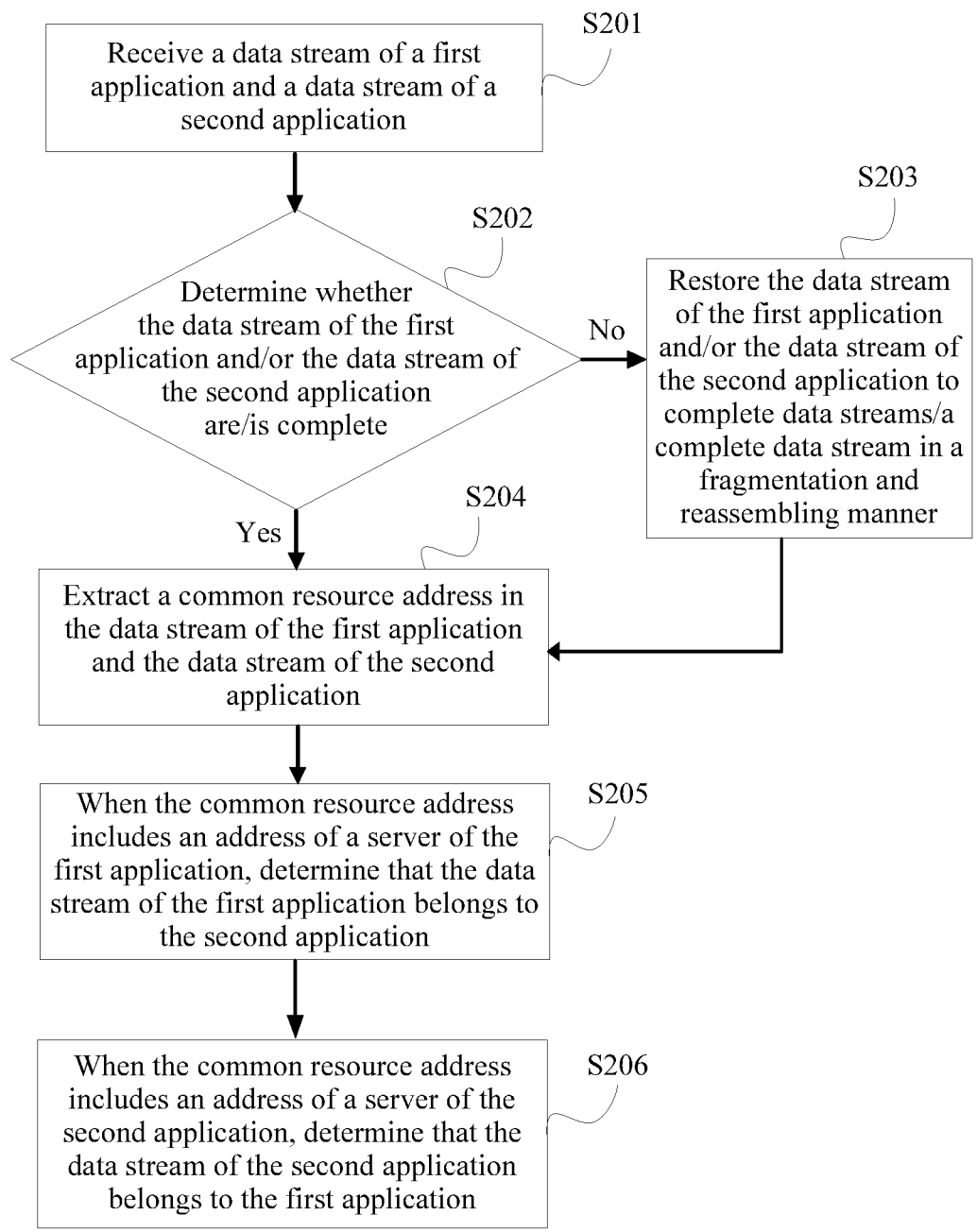
FIG. 2 is a flowchart of another data stream identifying method according to an embodiment of the present disclosure.

Referring to FIG. 2, FIG. 2 shows a data stream identifying method according to an embodiment of the present disclosure. In the method provided in this embodiment of the present disclosure, a data stream of an application can be restored to a complete data stream in a fragmentation and reassembling manner in a case in which a packet loss occurs in a data stream of a first application and/or a data stream of a second application, so as to ensure that associated information included in the data stream of the application is complete, where the method includes the following steps.

Step S201: Receive a data stream of a first application and a data stream of a second application.

Step S202: Determine whether the data stream of the first application and/or the data stream of the second application are/is complete, where if the data stream of the first application and/or the data stream of the second application are/is complete, go to step S204, and if the data stream of the first application and/or the data stream of the second application are/is not complete, go to step S203.

The data stream of the first application and the data stream of the second application may be request data packets or response data packets that are based on a protocol, for example, request data packets or response data packets that are based on the Hypertext Transfer Protocol (HTTP) protocol. After the data stream of the first application and the data stream of the second application are received, a case in which the data streams are not complete or are out of order may exist in the data streams of the two applications. Therefore, whether the data streams of the two applications are complete needs to be determined. Because determining whether a data stream is complete is a common technology known to a person skilled in the art, details are not described herein again.

Step S203: Restore the data stream of the first application and/or the data stream of the second application to complete data streams/a complete data stream in a fragmentation and reassembling manner.

If the data stream of the first application and/or the data stream of the second application are/is not complete, the data stream of the first application and/or the data stream of the second application need/needs to be restored to complete data streams/a complete data stream in the fragmentation and reassembling manner. For example, when both the data stream of the first application and the data stream of the second application are request data packets that are based on the HTTP protocol, a packet loss may occur in a transmission process of the request data packet of the first application or the request data packet of the second application, which causes that the request data packet of the first application or the request data packet of the second application is not complete, and a resource address included in the request data packet of the first application or the request data packet of the second application may also be lost. Therefore, when it is determined that the request data packet of the first application or the request data packet of the second application is not complete, the request data packet of the first application or the request data packet of the second application is restored to a complete request data packet in the fragmentation and reassembling manner.

Step S204: Extract a common resource address in the data stream of the first application and the data stream of the second application.

Step S205: When the common resource address includes an address of a server of the first application, determine that the data stream of the first application belongs to the second application.

Step S206: When the common resource address includes an address of a server of the second application, determine that the data stream of the second application belongs to the first application.

As shown in FIG. 2, a step of determining whether a data stream generated by an application is complete and a step of restoring a data stream to a complete data stream in a case in which the data stream is not complete are added in the embodiment shown in FIG. 2 on the basis of the embodiment shown in FIG. 1. In the embodiment shown in FIG. 2, it can be determined whether a data stream of an application is complete. If the data stream of the application is not complete, it indicates that a packet loss exists in a transmission process of the data stream of the application, and in this case, the data stream of the application is restored to a complete data stream in a fragmentation and reassembling manner, so as to ensure that associated information included in the data stream of the application is complete.

Figure 3:
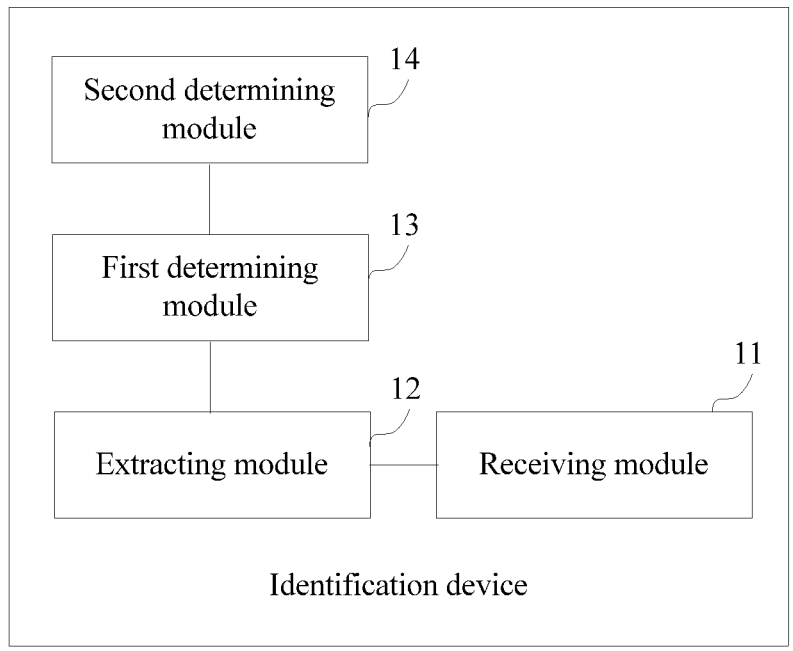
FIG. 3 is a module diagram of a data stream identifying device according to an embodiment of the present disclosure.

Referring to FIG. 3, FIG. 3 shows a data stream identifying device according to an embodiment of the present disclosure. The data stream identifying device may be a deep packet inspection (DPI) device. The DPI device may acquire a data stream exchanged between an application and an application server, and associate, by extracting a common resource address in a data stream of a first application and a data stream of a second application, data streams generated by different applications, so as to solve a problem that all traffic generated by an application cannot be associated with the application, thereby implementing precise identification of a belonging relationship between a data stream and an application. After identifying a belonging relationship between a data stream and an application, the DPI device sends the belonging relationship to a charging system, so that the charging system is ensured to charge according to a data stream generated by an application, thereby satisfying Internet surfing needs of different users. The data stream identifying device provided in this embodiment of the present disclosure can correctly identify a belonging relationship between an application and a data stream, where the device includes a receiving module 11 configured to receive a data stream of a first application and a data stream of a second application; an extracting module 12 configured to extract a common resource address in the data stream of the first application and the data stream of the second application; a first determining module 13 configured to, when the common resource address includes an address of a server of the first application, determine that the data stream of the first application belongs to the second application; and a second determining module 14 configured to, when the common resource address includes an address of a server of the second application, determine that the data stream of the second application belongs to the first application.

Figure 4:
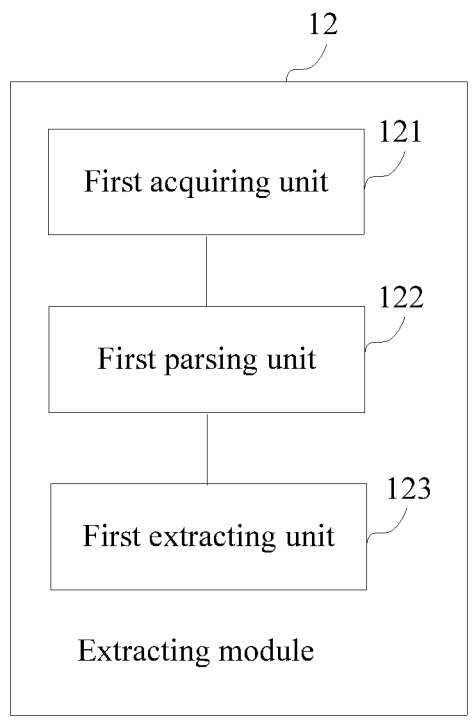
FIG. 4 is a module diagram of an extracting module according to an embodiment of the present disclosure.

Referring to FIG. 4, FIG. 4 shows a composition manner of the extracting module 12, where the extracting module 12 includes a first acquiring unit 121 configured to respectively acquire all data packets in the data stream of the first application and the data stream of the second application to obtain a first data packet group and a second data packet group; a first parsing unit 122 configured to respectively parse the first data packet group and the second data packet group to obtain a first dataset and a second dataset; and a first extracting unit 123 configured to extract the common resource address in the first dataset and the second dataset.

Figure 5:
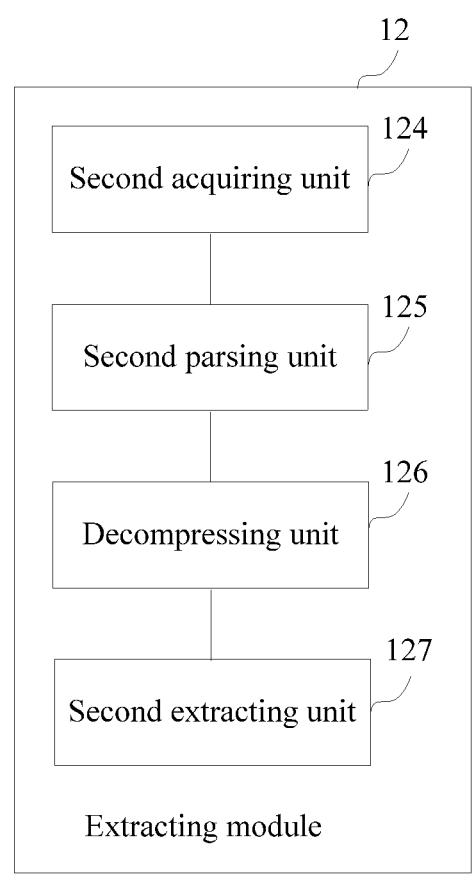
FIG. 5 is a module diagram of another extracting module according to an embodiment of the present disclosure.

Referring to FIG. 5, FIG. 5 shows another composition manner of the extracting module 12, where the extracting module 12 includes a second acquiring unit 124 configured to respectively acquire all data packets in the data stream of the first application and the data stream of the second application to obtain a first data packet group and a second data packet group; a second parsing unit 125 configured to respectively parse the first data packet group and the second data packet group to obtain a first compressed dataset and a second compressed dataset; a decompressing unit 126 configured to respectively decompress the first compressed dataset and the second compressed dataset to obtain a first dataset and a second dataset; and a second extracting unit 127 configured to extract the common resource address in the first dataset and the second dataset.

In the embodiment shown in FIG. 3, FIG. 4, and FIG. 5, functions of the data stream identifying device provided in this embodiment are corresponding to functions implemented in Embodiment 1. Therefore, for specific description about this embodiment and another function, refer to content in Embodiment 1, and details are not described herein again.

Figure 6:
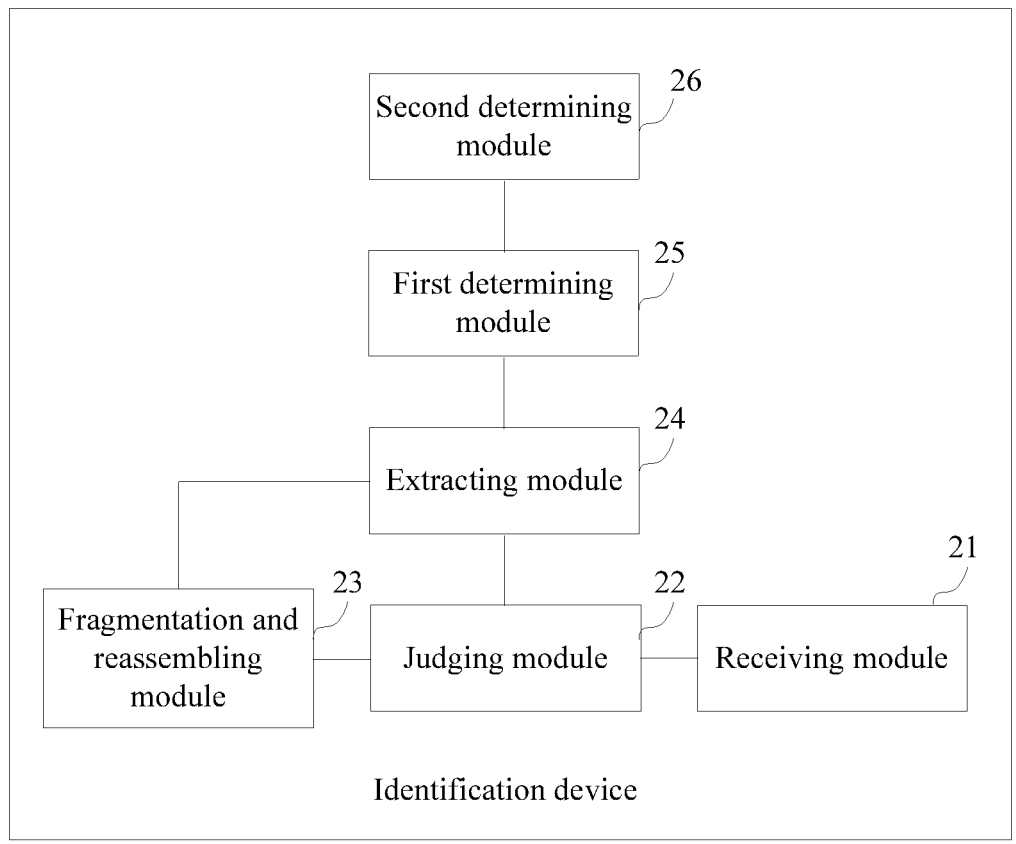
FIG. 6 is a module diagram of another data stream identifying device according to an embodiment of the present disclosure.

Referring to FIG. 6, FIG. 6 shows another data stream identifying device according to an embodiment of the present disclosure. The device provided in this embodiment of the present disclosure can restore a data stream of an application to a complete data stream in a fragmentation and reassembling manner in a case in which a packet loss occurs in a data stream of a first application and/or a data stream of a second application, so as to ensure that associated information included in the data stream of the application is complete, where the device includes a receiving module 21 configured to receive a data stream of a first application and a data stream of a second application; a judging module 22 configured to determine whether the data stream of the first application and/or the data stream of the second application are/is complete; a fragmentation and reassembling module 23 configured to, when the data stream of the first application and/or the data stream of the second application are/is not complete, restore the data stream of the first application and/or the data stream of the second application to complete data streams/a complete data stream in a fragmentation and reassembling manner; an extracting module 24 configured to extract a common resource address in the data stream of the first application and the data stream of the second application; a first determining module 25 configured to, when the common resource address includes an address of a server of the first application, determine that the data stream of the first application belongs to the second application; and a second determining module 26 configured to, when the common resource address includes an address of a server of the second application, determine that the data stream of the second application belongs to the first application.

In the embodiment shown in FIG. 6, functions of the data stream identifying device provided in this embodiment are corresponding to functions implemented in embodiments illustrated in FIG. 2. Therefore, for specific description about this embodiment and another function, refer to the description related to FIG. 2, and details are not described herein again.

Figure 7:
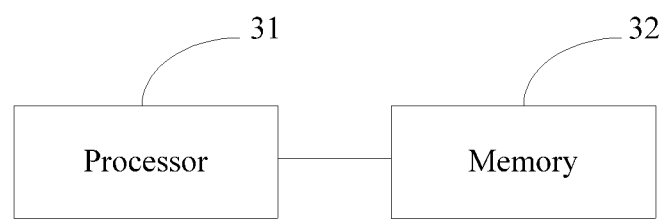
FIG. 7 is a module diagram of yet another data stream identifying device according to an embodiment of the present disclosure.

Referring to FIG. 7, FIG. 7 shows yet another data stream identifying device according to an embodiment of the present disclosure. The device provided in this embodiment of the present disclosure can correctly identify a belonging relationship between an application and a data stream. The device includes a processor 31 and a memory 32, where the memory 32 stores an operation instruction that the processor 31 can execute, and the processor 31 reads the operation instruction in the memory 32 to implement the following functions: receiving a data stream of a first application and a data stream of a second application; extracting a common resource address in the data stream of the first application and the data stream of the second application; when the common resource address includes an address of a server of the first application, determining that the data stream of the first application belongs to the second application; and when the common resource address includes an address of a server of the second application, determining that the data stream of the second application belongs to the first application.

Figure 8:
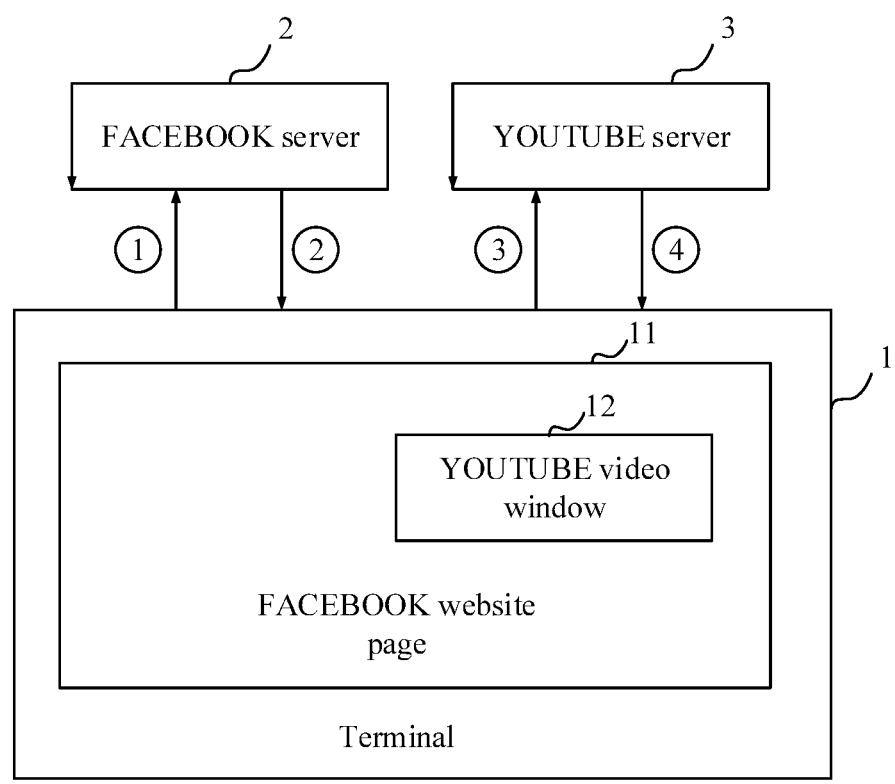
FIG. 8 is a schematic modular diagram of information exchange between a terminal and a server according to an embodiment of the present disclosure.

Referring to FIG. 8, FIG. 8 shows a schematic modular diagram of information exchange between a terminal and a server according to an embodiment of the present disclosure. It is assumed that a Facebook website page 11 is open on a terminal 1, a YouTube video window 12 is nested on the Facebook website page 11, and content played in the YouTube video window 12 is a video resource on a YouTube server 3.

In an application example shown in FIG. 8, a Facebook server 2 and the YouTube server 3 have established a relationship in advance, and the YouTube server 3 automatically sends information, such as a video name, a video identifier (ID), and a play URL that are corresponding to a video to the Facebook server 2. After the terminal 1 receives an instruction for playing a video resource in the YouTube video window 12, the terminal 1 separately exchanges information with the Facebook server 2 and the YouTube server 3, and for information exchange processes, refer to the following steps.

Step ①: The terminal 1 sends, to the Facebook server 2, an instruction for acquiring a URL corresponding to a video ID in the YouTube video window 12;

Step ②: The Facebook server 2 sends the URL corresponding to the video ID to the terminal 1, where it is assumed that the URL is http://www.youtube.com/A/B;

Step ③: The terminal 1 sends, to the YouTube server 3, an instruction for acquiring a video resource corresponding to URL=http://www.youtube.com/A/B; and Step ④: The YouTube server 3 sends the video resource corresponding to URL=http://www.youtube.com/A/B to the terminal 1, and the terminal 1 displays the video resource in the YouTube video window 12.

After identification is performed using a traditional DPI technology, it can be learned that in step ① and step ②, a data stream generated in an exchange process between the terminal 1 and the Facebook server 2 belongs to the Facebook website page 11, and in step ③ and step ④, a data stream generated in an exchange process between the terminal 1 and the YouTube server 3 belongs to the YouTube video window 12.

Because the YouTube video window 12 is nested on the Facebook website page 11, a data stream corresponding to the YouTube video window 12 should belong to the Facebook website page 11. For determining of a belonging relationship between a data stream and an application, refer to the following steps:

Step ①: Receive a data stream of the Facebook website page 11 and a data stream of the YouTube video window 12; and Step ②: Extract a common resource address URL=http://www.youtube.com/A/B in the data stream generated by the Facebook website page 11 and the data stream generated by the YouTube video window 12.

Because the resource address URL=http://www.youtube.com/A/B includes a server address www.youtube.com corresponding to the YouTube video window 12, the data stream generated by the YouTube video window 12 belongs to the Facebook website page 11.

It should be noted that the embodiments shown in FIG. 1 to FIG. 8 are merely embodiments introduced in the present disclosure, and a person skilled in the art absolutely can design more embodiments based on the embodiments; therefore, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by an identification computing device, comprising:
   receiving, by the identification computing device, a data stream of a first application and a data stream of a second application, the data stream of the first application and the data stream of the second application being received from a terminal computing device that executes the first application and the second application, and either the first application is nested within the second application or the second application is nested within the first application;
   extracting, by the identification computing device, a common resource address in the data stream of the first application and the data stream of the second application, the common resource address either being an address of a server of the first application or an address of a server of the second application;
   identifying, by the identification computing device, that the first application is nested within the second application when the common resource address comprises the address of the server of the first application;
   identifying, by the identification computing device, that the second application is nested within the first application when the common resource address comprises the address of the server of the second application; and identifying, by the identification computing device, applications associated with data streams to collect statistics of application usage based on the identification of whether the first application is nested within the second application or the second application is nested within the first application.

2. The method of claim 1, wherein after receiving the data stream of the first application and the data stream of the second application and before extracting the common resource address in the data stream of the first application and the data stream of the second application, the method further comprises:
determining, by the identification computing device, whether the data stream of the first application and the data stream of the second application are complete; and
restoring, by the identification computing device, the data stream of the first application and the data stream of the second application to complete data streams in a fragmentation and reassembling manner when the data stream of the first application and the data stream of the second application are not complete.

3. The method of claim 1, wherein extracting the common resource address in the data stream of the first application and the data stream of the second application comprises:
respectively acquiring, by the identification computing device, all data packets in the data stream of the first application and the data stream of the second application to obtain a first data packet group and a second data packet group;
respectively parsing, by the identification computing device, the first data packet group and the second data packet group to obtain a first dataset and a second dataset; and
extracting, by the identification computing device, the common resource address in the first dataset and the second dataset.

4. The method of claim 1, wherein extracting the common resource address in the data stream of the first application and the data stream of the second application comprises:
respectively acquiring, by the identification computing device, all data packets in the data stream of the first application and the data stream of the second application to obtain a first data packet group and a second data packet group;
respectively parsing, by the identification computing device, the first data packet group and the second data packet group to obtain a first compressed dataset and a second compressed dataset;
respectively decompressing, by the identification computing device, the first compressed dataset and the second compressed dataset to obtain a first dataset and a second dataset; and
extracting, by the identification computing device, the common resource address in the first dataset and the second dataset.

5. The method of claim 1, further comprising providing to a charging system either information indicating that the first application is nested within the second application or information indicating that the second application is nested within the first application.

6. The method of claim 1, wherein the common resource address comprises a uniform resource locator.

7. The method of claim 1, wherein the common resource address comprises an Internet Protocol address.

8. The method of claim 1, wherein the common resource address comprises a HOST address.

9. The method of claim 1, wherein the data stream of the first application and the data stream of the second application comprise hypertext transfer protocol data packets.

10. The method of claim 1, wherein the first application and the second application comprise social media websites.

11. The method of claim 1, wherein the identification computing device comprises a deep packet inspection computing device.

12. A data stream identifying device, comprising:
a processor; and
a memory storing an operation instruction executable by the processor, the processor being configured to execute the operation instruction and cause the data stream identifying device to:
receive a data stream of a first application and a data stream of a second application, the data stream of the first application and the data stream of the second application being received from a terminal computing device that executes the first application and the second application, and either the first application is nested within the second application or the second application is nested within the first application;
extract a common resource address in the data stream of the first application and the data stream of the second application, the common resource address either being an address of a server of the first application or an address of a server of the second application;
identify that the first application is nested within the second application when the common resource address comprises the address of the server of the first application;
identify that the second application is nested within the first application when the common resource address comprises the address of the server of the second application; and
identify applications associated with data streams to collect statistics of application usage based on the identification of whether the first application is nested within the second application or the second application is nested within the first application.

13. The device of claim 12, wherein the data stream identifying device is further configured to:
determine whether the data stream of the first application and the data stream of the second application are complete; and
restore the data stream of the first application and the data stream of the second application to complete data streams in a fragmentation and reassembling manner when the data stream of the first application and the data stream of the second application are not complete.

14. The device of claim 12, wherein the data stream identifying device is further configured to:
respectively acquire all data packets in the data stream of the first application and the data stream of the second application to obtain a first data packet group and a second data packet group;
respectively parse the first data packet group and the second data packet group to obtain a first dataset and a second dataset; and
extract the common resource address in the first dataset and the second dataset.

15. The device of claim 12, wherein the data stream identifying device is further configured to:

respectively acquire all data packets in the data stream of the first application and the data stream of the second application to obtain a first data packet group and a second data packet group;

respectively parse the first data packet group and the second data packet group to obtain a first compressed dataset and a second compressed dataset;

respectively decompress the first compressed dataset and the second compressed dataset to obtain a first dataset and a second dataset; and extract the common resource address in the first dataset and the second dataset.

16. The device of claim 12, wherein the data stream identifying device is further configured to provide to a charging system either information indicating that the first application is nested within the second application or information indicating that the second application is nested within the first application.

17. The device of claim 12, wherein the common resource address comprises a uniform resource locator, an Internet Protocol address, or a HOST address.

18. The device of claim 12, wherein the first application and the second application comprise social media websites.

* * * * *